UNITED STATES PATENT OFFICE.

LEMUEL H. WODDROP, OF ARCOLA, NEW JERSEY, ASSIGNOR TO ROBESON PROCESS COMPANY, OF NEW YORK, N. Y., A CORPORATION OF NEW JERSEY.

BINDER.

1,221,259.  Specification of Letters Patent.  Patented Apr. 3, 1917.

No Drawing.  Application filed December 4, 1916.  Serial No. 135,074.

*To all whom it may concern:*

Be it known that I, LEMUEL H. WODDROP, a citizen of the United States, residing at Arcola, in the county of Bergen and State of New Jersey, have invented certain new and useful Improvements in Binders, of which the following is a specification.

This invention relates to binders; and it comprises as a new composition of matter a material suitable for use as a binder comprising an admixture coal, a dry sulfite waste liquor preparation and a pitchy or tarry material; all as more fully hereinafter set forth and as claimed.

In making cores for recessed or hollow iron castings it is customary to mingle sand with some form of binder, form into the desired shape and make the casting. For this purpose the binder must have quite special properties. It must mix readily with the sand, enable it to be molded readily and give a considerable degree of strength. In handling and use of the molded core the sand in the sharp corners must not disintegrate. Nor must the core change in shape or dimensions during drying and heating. It is rather difficult to secure this combination of qualities in any binding material. Many binders are in use but they are all more or less unsatisfactory, in one relation or another. One of the common binders is what is known as black compound; a mixture composed in substance of finely powdered bituminous coal, pitch or tarry material and dextrin. Each of the three has its special function in use. The dextrin gives the quality of shaping in connection with water and also acts as binder, the tarry or pitchy material is a binder during some of the baking temperature and the coking of the soft coal gives a binder at high temperatures. This composition though not altogether satisfactory is extensively used in spite of the relatively high cost of commercial dextrin. One serious objection to it is the inordinate amount of gases given off in the heating operation. However its good qualities outweigh its bad and are sufficient to warrant its use in spite of the cost and the gassing.

I have found that I can produce a cheaper binder of this type which is more satisfactory in use than the usual black compound by substituting for the dextrin, in whole or in part, certain dry powdered materials obtained from the desiccation of sulfite waste liquor. Sulfite waste liquor is the liquid formed when wood is digested with acid sulfite of lime, etc. About half the wood goes into solution to form new soluble organic bodies whose nature is not exactly known. As they behave like the salts of sulfonic matters the organic matters for the sake of a name are called lignosulfonates. In the case of the original sulfite liquor having been made with pure lime, the organic materials are lignosulfonate of calcium. When it is made with dolomitic lime they are lignosulfonates of calcium and magnesium. Sulfite liquor is quite unstable but with proper precautions, including exact neutralization and evaporation *in vacuo* (Patent 833,634) it may be concentrated to a thick viscous liquor which is on the market and is used for various purposes. By further concentration on rotating drums or the like and grinding it may be converted into a loose light powder. It is material of this character which I particularly contemplate in the present invention although other dry powdered sulfite waste liquor preparations may be used in its lieu, such as the preparations made by directly evaporating the liquor in an acid state. These preparations however are not as advantageous.

I have found that by mixing this dry sulfite waste liquor with bituminous coal and a tarry or pitchy body, which may advantageously be a hard coal tar pitch, I can produce a binder of great utility in making said cores. It is better to use the coal as in the ordinary black compound, though it can be omitted and still give a binder having many merits. Or other pulverulent materials such as gypsum (plaster) ground slate, etc., may be used to replace the coal in whole or in part. Of course some dextrin or even flour or meal may be worked into the mixture. The preparation of the present invention gives a core less sensitive to moisture and considerably stronger in tensile strength than that afforded by the ordinary black compound and more satisfactory in use. The core does not readily break down or disintegrate under ordinary foundry conditions. The amount of gas given off is very little; and the preparation in this respect, as well as in others, is much better than that made with dextrin.

Illustrative results may be given of certain practical work with a mixture of this kind. In this work, the sand employed was one-third molding sand, one-third sharp sand and one-third burnt sand while the binders were used in the proportion of one part to 40 parts of sand. In each instance the mixture, which was a dry powder, was mixed with the dry sand and then moistened with 10 per cent. of water; 10 parts of water for each 100 parts of the mixture. The damp mixture was molded into form and dried at 350° F. for an hour. With 500 parts of fine ground bituminous coal 1200 parts of tar and 300 parts of commercial dry sulfite waste liquor the tensile strength was 11.50 pounds when dry. The core was covered with damp sand and allowed to stand over night when the strength was found to be reduced comparatively little, the shaped core now exhibiting 5.5 pounds. The core retained 59 per cent. of its original strength under this drastic treatment. A similar mixture in which the proportion of tar was reduced from 1200 to 1100 parts and that of the sulfite liquor increased correspondingly, that is to 400 parts, gave a tensile strength much superior; a strength of 16.50 pounds which was reduced by maintaining in damp sand but nevertheless showed after 12 hours exposure 7.5 pounds strength still remaining. Further increases in the amount of the sulfite waste liquor and diminutions in the amount of tar gave the same result of increasing the tensile strength. All these mixtures gave cores which produced better castings than the ordinary compound. The cores exposed to damp sand were used for molding and still gave good results. It was found in the foundry that the green strength of these cores was much greater than usual, permitting easy and ready handling while the cores were harder than the usual cores. Casting was good and cleaning better than usual while there were no blows. Sample cores were left in damp earth for a day and a half after remaining exposed to the air for ten days. On use they gave good castings with no vent, no blowing, etc.

A very good composition for general use may be made by taking 500 parts of hard coal tar pitch, about 800 to 850 parts of fine powdered coal and about 600 to 700, say 650, parts of commercial dry sulfite waste liquor.

Any suitable bituminous coal may be employed. It is best ground to a fine mesh. For the tarry or pitchy component, hard asphalt, coal tar pitch, coal tar itself, asphaltic oils, etc., may all be used. They all give good results; but I prefer a hard coal tar pitch since it is readily reduced to powder and it is therefore easier to use in making the compound.

The above binder may be used with other granular materials than core sand with good results. It may, for example, be used for making briquets of coal, giving strong, hard, and resistant briquets which resist the water and even immersion and burn like the coal used in making them. The binder contributes no smoky or injurious quality to the flame. In making coal briquets I have used asphaltic oils of the quality which are known as fluxes. An oily residuum recovered from Texas oil by distilling off the more valuable components serves excellently well for the present purposes.

What I claim is:—

1. A composition comprising powdered coal, a dried sulfite waste liquor preparation and bituminous matter.

2. A binding composition comprising powdered coal, a dried sulfite waste liquor preparation and pitch.

3. An article comprising an intimate mixture of bituminous coal, dry sulfite waste liquor, bituminous matter and granular material bound and united by said mixture.

4. An article comprising an intimate mixture of bituminous coal, dry sulfite waste liquor, bituminous matter and sand bound and united by said mixture.

5. As a composition for binding purposes, an intimate mixture of dry sulfite waste liquor, pitchy matter and an inert pulverulent material.

6. As an improved black compound; an intimate mixture of finely powdered dry sulfite waste liquor solids, bituminous coal and pitch.

In testimony whereof, I affix my signature.

LEMUEL H. WODDROP.

Witnesses:
B. W. BULLEN,
H. J. LEGGETT.